J. S. APPLETON.
WASHER-CUTTER.

No. 177,982. Patented May 30, 1876.

WITNESSES

INVENTOR
James S. Appleton,
Chipman Hosmer & Co
ATTORNEYS

UNITED STATES PATENT OFFICE.

JAMES S. APPLETON, OF BURLINGTON, VERMONT, ASSIGNOR OF ONE-HALF HIS RIGHT TO ANDREW McGAFFY, OF SAME PLACE.

IMPROVEMENT IN WASHER-CUTTERS.

Specification forming part of Letters Patent No. 177,982, dated May 30, 1876; application filed November 6, 1875.

*To all whom it may concern:*

Be it known that I, JAMES S. APPLETON, of Burlington, in the county of Chittenden and State of Vermont, have invented a new and valuable Improvement in Washer-Cutters; and I do hereby declare that the following is a full, clear, and exact description of the construction and operation of the same, reference being had to the annexed drawings, making a part of this specification, and to the letters and figures of reference marked thereon.

Figure 1:
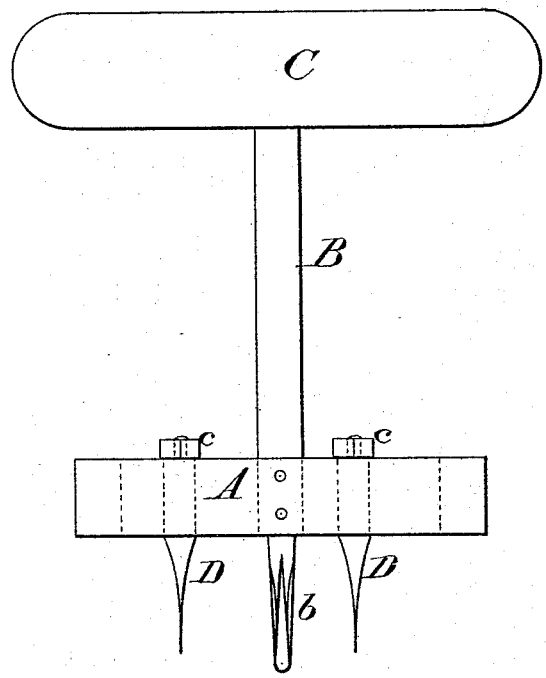
Figure 2:
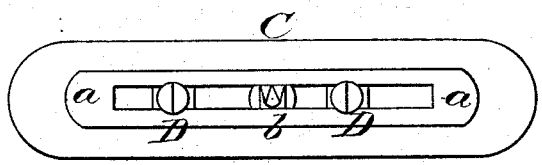
Figure 2:
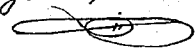

Figure 1 of the drawings is a representation of a side view of my washer-cutter. Fig. 2 is a bottom view.

This invention has relation to devices for cutting washers; and the nature of my invention consists in a hand-tool having a slotted tool holder or head, which is closed at both ends, and provided with a rigid center-bit and two adjustable cutters, as will be hereinafter explained.

In the annexed drawings, A designates a tool-holder, which is a slotted bar connected at both ends, as shown at $a\ a$, for the purpose of preventing the sides bounding the slot from separating. B designates a stem, having a T-handle, C, and also a "spud" or boring tool, $b$. This stem is rigidly secured into the tool-holder at the middle of the length thereof. On each side of the spud $b$ is a cutter, D, the shank of which is flattened, and passed up through the slot in the tool-holder. The cutters are confined in their places by means of nuts $c$, by loosening which these cutters can be adjusted for any desired size of washer.

The advantage of my washer-cutter over others is, that the tool-holder will not spring open and allow the cutters to slip while in the act of cutting washers.

I am aware that a washer-cutter having a center-pin and adjustable cutters is not new, broadly, and I therefore do not claim such invention; but

What I claim as new, and desire to secure by Letters Patent, is—

The improved hand-tool for cutting washers, consisting of the slotted tool-holder A, closed at both ends, the rigidly-connected stem B, having a T-shaped handle, C, and a spud, $b$, and the adjustable cutters D D, the shanks of which are flattened, and passed up through the slot of the tool-holder, as shown and described.

In testimony that I claim the above I have hereunto subscribed my name in the presence of two witnesses.

JAMES S. APPLETON.

Witnesses:
ANDREW McGAFFY,
RUSSELL S. TAFT.